(12) United States Patent
Girish et al.

(10) Patent No.: US 7,673,238 B2
(45) Date of Patent: Mar. 2, 2010

(54) PORTABLE MEDIA DEVICE WITH VIDEO ACCELERATION CAPABILITIES

(75) Inventors: Muthya K. Girish, Santa Clara, CA (US); Aram Lindahl, Menlo Park, CA (US); Joseph Mark Williams, Dallas, TX (US)

(73) Assignee: Apple Inc., Cupertino, CA (US)

( * ) Notice: Subject to any disclaimer, the term of this patent is extended or adjusted under 35 U.S.C. 154(b) by 367 days.

(21) Appl. No.: 11/327,544

(22) Filed: Jan. 5, 2006

(65) Prior Publication Data
US 2007/0157268 A1     Jul. 5, 2007

(51) Int. Cl.
*G06F 3/00* (2006.01)
(52) U.S. Cl. ...................................... 715/716
(58) Field of Classification Search ........................ None
See application file for complete search history.

(56) References Cited

U.S. PATENT DOCUMENTS

| | | | |
|---|---|---|---|
| 4,090,216 A | 5/1978 | Constable |
| 4,386,345 A | 5/1983 | Narveson et al. |
| 4,451,849 A | 5/1984 | Fuhrer |
| 4,589,022 A | 5/1986 | Prince et al. |
| 4,908,523 A | 3/1990 | Snowden et al. |
| 4,928,307 A | 5/1990 | Lynn |
| 4,951,171 A | 8/1990 | Tran et al. |
| 5,185,906 A | 2/1993 | Brooks |
| 5,293,494 A | 3/1994 | Saito et al. |
| 5,406,305 A | 4/1995 | Shimomura et al. |
| 5,559,945 A | 9/1996 | Beaudet et al. |
| 5,566,337 A | 10/1996 | Szymanski et al. |
| 5,583,993 A | 12/1996 | Foster et al. |
| 5,608,698 A | 3/1997 | Yamanoi et al. |
| 5,616,876 A | 4/1997 | Cluts |
| 5,617,386 A | 4/1997 | Choi |
| 5,670,985 A | 9/1997 | Cappels, Sr. et al. |
| 5,684,513 A | 11/1997 | Decker |
| 5,710,922 A | 1/1998 | Alley et al. |
| 5,712,949 A | 1/1998 | Kato et al. |
| 5,721,949 A | 2/1998 | Smith et al. |
| 5,726,672 A | 3/1998 | Hernandez et al. |
| 5,739,451 A | 4/1998 | Winksy et al. |
| 5,740,143 A | 4/1998 | Suetomi |
| 5,760,588 A | 6/1998 | Bailey |

(Continued)

FOREIGN PATENT DOCUMENTS

DE      43 34 773 A1      4/1994

(Continued)

OTHER PUBLICATIONS

Guy Hart-Davis, "How to Do Everything with Your IPod & IPod Mini", 2004, McGraw-Hill Professional, p. 33.*

(Continued)

*Primary Examiner*—Laurie Ries
*Assistant Examiner*—Daniel Um
(74) *Attorney, Agent, or Firm*—Beyer Law Group LLP

(57) ABSTRACT

Improved techniques for performing accelerated video presentation on a media device are disclosed. The improved techniques enable smooth, uniform accelerated video presentation by displaying key frames from a video file in a periodic fashion. The rate and direction of accelerated video presentation can be controlled. The improved techniques are well suited for use with portable media devices.

22 Claims, 8 Drawing Sheets

U.S. PATENT DOCUMENTS

| | | |
|---|---|---|
| 5,778,374 A | 7/1998 | Dang et al. |
| 5,803,786 A | 9/1998 | McCormick |
| 5,815,225 A | 9/1998 | Nelson |
| 5,822,288 A | 10/1998 | Shinada |
| 5,835,721 A | 11/1998 | Donahue et al. |
| 5,835,732 A | 11/1998 | Kikinis et al. |
| 5,838,969 A | 11/1998 | Jacklin et al. |
| 5,864,868 A | 1/1999 | Contois |
| 5,867,163 A | 2/1999 | Kurtenbach |
| 5,870,710 A | 2/1999 | Ozawa et al. |
| 5,918,303 A | 6/1999 | Yamaura et al. |
| 5,920,728 A | 7/1999 | Hallowell et al. |
| 5,923,757 A | 7/1999 | Hocker et al. |
| 5,952,992 A | 9/1999 | Helms |
| 6,006,274 A | 12/1999 | Hawkins et al. |
| 6,009,237 A | 12/1999 | Hirabayashi et al. |
| 6,011,585 A | 1/2000 | Anderson |
| 6,018,705 A | 1/2000 | Gaudet et al. |
| 6,041,023 A | 3/2000 | Lakhansingh |
| 6,052,654 A | 4/2000 | Gaudet et al. |
| 6,108,426 A | 8/2000 | Stortz |
| 6,122,340 A | 9/2000 | Darley et al. |
| 6,158,019 A | 12/2000 | Squibb |
| 6,161,944 A | 12/2000 | Leman |
| 6,172,948 B1 | 1/2001 | Keller et al. |
| 6,179,432 B1 | 1/2001 | Zhang et al. |
| 6,185,163 B1 | 2/2001 | Bickford et al. |
| 6,191,939 B1 | 2/2001 | Burnett |
| 6,208,044 B1 | 3/2001 | Viswanadham et al. |
| 6,216,131 B1 | 4/2001 | Liu et al. |
| 6,217,183 B1 | 4/2001 | Shipman |
| 6,248,946 B1 | 6/2001 | Dwek |
| 6,295,541 B1 | 9/2001 | Bodnar et al. |
| 6,298,314 B1 | 10/2001 | Blackadar et al. |
| 6,332,175 B1 | 12/2001 | Birrell et al. |
| 6,336,365 B1 | 1/2002 | Blackadar et al. |
| 6,336,727 B1 | 1/2002 | Kim |
| 6,341,316 B1 | 1/2002 | Kloba et al. |
| 6,357,147 B1 | 3/2002 | Darley et al. |
| 6,377,530 B1 | 4/2002 | Burrows |
| 6,452,610 B1 * | 9/2002 | Reinhardt et al. ........... 715/716 |
| 6,467,924 B2 | 10/2002 | Shipman |
| 6,493,652 B1 | 12/2002 | Ohlenbusch et al. |
| 6,536,139 B2 | 3/2003 | Darley et al. |
| 6,549,497 B2 | 4/2003 | Miyamoto et al. |
| 6,560,903 B1 | 5/2003 | Darley |
| 6,587,403 B1 | 7/2003 | Keller et al. |
| 6,587,404 B1 | 7/2003 | Keller et al. |
| 6,605,038 B1 | 8/2003 | Teller et al. |
| 6,606,281 B2 | 8/2003 | Cowgill et al. |
| 6,611,789 B1 | 8/2003 | Darley |
| 6,617,963 B1 | 9/2003 | Watters et al. |
| 6,621,768 B1 | 9/2003 | Keller et al. |
| 6,623,427 B2 | 9/2003 | Mandigo |
| 6,631,101 B1 | 10/2003 | Chan et al. |
| 6,693,612 B1 | 2/2004 | Matsumoto et al. |
| 6,731,312 B2 | 5/2004 | Robbin |
| 6,760,536 B1 * | 7/2004 | Amir et al. .................... 386/68 |
| 6,762,741 B2 | 7/2004 | Weindorf |
| 6,794,566 B2 | 9/2004 | Pachet |
| 6,799,226 B1 | 9/2004 | Robbin et al. |
| 6,801,964 B1 | 10/2004 | Mahdavi |
| 6,870,529 B1 | 3/2005 | Davis |
| 6,871,063 B1 | 3/2005 | Schiffer |
| 6,876,947 B1 | 4/2005 | Darley et al. |
| 6,882,955 B1 | 4/2005 | Ohlenbusch et al. |
| 6,898,550 B1 | 5/2005 | Blackadar et al. |
| 6,911,971 B2 | 6/2005 | Suzuki et al. |
| 6,918,677 B2 | 7/2005 | Shipman |
| 6,934,812 B1 | 8/2005 | Robbin et al. |
| 6,950,087 B2 | 9/2005 | Knox et al. |
| 7,028,096 B1 | 4/2006 | Lee |
| 7,046,230 B2 | 5/2006 | Zadesky |
| 7,062,225 B2 | 6/2006 | White |
| 7,084,856 B2 | 8/2006 | Huppi |
| 7,084,921 B1 | 8/2006 | Ogawa |
| 7,092,946 B2 | 8/2006 | Bodnar |
| 7,124,125 B2 | 10/2006 | Cook et al. |
| 7,143,241 B2 | 11/2006 | Hull |
| 7,146,437 B2 | 12/2006 | Robbin et al. |
| 7,171,331 B2 | 1/2007 | Vock et al. |
| 7,191,244 B2 | 3/2007 | Jennings et al. |
| 7,213,228 B2 | 5/2007 | Putterman et al. |
| 7,234,026 B2 | 6/2007 | Robbin et al. |
| 7,277,928 B2 | 10/2007 | Lennon |
| 7,301,857 B2 | 11/2007 | Shah et al. |
| 7,356,679 B1 | 4/2008 | Le et al. |
| 7,508,535 B2 | 3/2009 | Hart et al. |
| 2001/0013983 A1 | 8/2001 | Izawa et al. |
| 2001/0037367 A1 | 11/2001 | Iyer |
| 2001/0041021 A1 | 11/2001 | Boyle et al. |
| 2001/0042107 A1 | 11/2001 | Palm |
| 2002/0002413 A1 | 1/2002 | Tokue |
| 2002/0013784 A1 | 1/2002 | Swanson |
| 2002/0045961 A1 | 4/2002 | Gibbs et al. |
| 2002/0046315 A1 | 4/2002 | Miller et al. |
| 2002/0055934 A1 | 5/2002 | Lipscomb et al. |
| 2002/0090912 A1 | 7/2002 | Cannon et al. |
| 2002/0116082 A1 | 8/2002 | Gudorf |
| 2002/0152045 A1 | 10/2002 | Dowling et al. |
| 2002/0156833 A1 | 10/2002 | Maurya et al. |
| 2002/0161865 A1 | 10/2002 | Nguyen |
| 2002/0173273 A1 | 11/2002 | Spurgat et al. |
| 2002/0189426 A1 | 12/2002 | Hirade et al. |
| 2002/0189429 A1 | 12/2002 | Qian et al. |
| 2002/0199043 A1 | 12/2002 | Yin |
| 2003/0037254 A1 | 2/2003 | Fischer et al. |
| 2003/0046434 A1 | 3/2003 | Flanagin et al. |
| 2003/0050092 A1 | 3/2003 | Yun |
| 2003/0074457 A1 | 4/2003 | Kluth |
| 2003/0076301 A1 | 4/2003 | Tsuk et al. |
| 2003/0076306 A1 | 4/2003 | Zadesky |
| 2003/0079038 A1 | 4/2003 | Robbin et al. |
| 2003/0095096 A1 | 5/2003 | Robbin et al. |
| 2003/0097379 A1 | 5/2003 | Ireton |
| 2003/0104835 A1 | 6/2003 | Douhet |
| 2003/0128192 A1 | 7/2003 | van Os |
| 2003/0133694 A1 | 7/2003 | Yeo |
| 2003/0153213 A1 | 8/2003 | Siddiqui et al. |
| 2003/0156503 A1 | 8/2003 | Schilling et al. |
| 2003/0167318 A1 | 9/2003 | Robbin et al. |
| 2003/0176935 A1 | 9/2003 | Lian et al. |
| 2003/0229490 A1 | 12/2003 | Etter |
| 2004/0001395 A1 | 1/2004 | Keller et al. |
| 2004/0001396 A1 | 1/2004 | Keller et al. |
| 2004/0012556 A1 | 1/2004 | Yong et al. |
| 2004/0055446 A1 | 3/2004 | Robbin et al. |
| 2004/0069122 A1 | 4/2004 | Wilson |
| 2004/0076086 A1 | 4/2004 | Keller |
| 2004/0086120 A1 | 5/2004 | Akins, III et al. |
| 2004/0094018 A1 | 5/2004 | Ueshima et al. |
| 2004/0125522 A1 | 7/2004 | Chiu et al. |
| 2004/0165302 A1 | 8/2004 | Lu |
| 2004/0177063 A1 | 9/2004 | Weber et al. |
| 2004/0198436 A1 | 10/2004 | Alden |
| 2004/0224638 A1 | 11/2004 | Fadell et al. |
| 2004/0267825 A1 | 12/2004 | Novak et al. |
| 2005/0015254 A1 | 1/2005 | Beaman |
| 2005/0053365 A1 | 3/2005 | Adams et al. |
| 2005/0108754 A1 | 5/2005 | Carhart et al. |
| 2005/0111820 A1 | 5/2005 | Matsumi et al. |
| 2005/0122315 A1 | 6/2005 | Chalk et al. |
| 2005/0123886 A1 | 6/2005 | Hua et al. |
| 2005/0152294 A1 | 7/2005 | Yu et al. |

| | | | |
|---|---|---|---|
| 2005/0160270 A1 | 7/2005 | Goldberg et al. | |
| 2005/0166153 A1 | 7/2005 | Eytchison et al. | |
| 2005/0245839 A1 | 11/2005 | Stivoric et al. | |
| 2005/0248555 A1 | 11/2005 | Feng et al. | |
| 2005/0259524 A1 | 11/2005 | Yeh | |
| 2006/0013414 A1 | 1/2006 | Shih | |
| 2006/0068760 A1 | 3/2006 | Hameed et al. | |
| 2006/0088228 A1 | 4/2006 | Marriott et al. | |
| 2006/0098320 A1 | 5/2006 | Koga et al. | |
| 2006/0135883 A1 | 6/2006 | Jonsson et al. | |
| 2006/0152382 A1 | 7/2006 | Hiltunen | |
| 2006/0155914 A1 | 7/2006 | Jobs et al. | |
| 2006/0170535 A1 | 8/2006 | Watters et al. | |
| 2006/0190577 A1 | 8/2006 | Yamada | |
| 2006/0221788 A1 | 10/2006 | Lindahl et al. | |
| 2006/0265503 A1 | 11/2006 | Jones et al. | |
| 2006/0272483 A1 | 12/2006 | Honeywell | |
| 2007/0028009 A1 | 2/2007 | Robbin et al. | |
| 2007/0124679 A1* | 5/2007 | Jeong et al. | 715/723 |
| 2007/0135225 A1 | 6/2007 | Nieminen et al. | |
| 2007/0255163 A1 | 11/2007 | Prineppi | |

FOREIGN PATENT DOCUMENTS

| | | |
|---|---|---|
| DE | 44 45 023 A1 | 6/1996 |
| EP | 0 127 139 | 5/1984 |
| EP | 0578604 | 1/1994 |
| EP | 0 757 437 | 2/1997 |
| EP | 0 813 138 | 12/1997 |
| EP | 0 863 469 | 9/1998 |
| EP | 0 917 077 | 5/1999 |
| EP | 0 982 732 | 3/2000 |
| EP | 1 028 425 | 8/2000 |
| EP | 1028426 A2 | 8/2000 |
| EP | 1 076 302 | 2/2001 |
| EP | 1 213 643 | 6/2002 |
| EP | 1289197 | 3/2003 |
| EP | 1 503 363 | 2/2005 |
| EP | 1536612 | 6/2005 |
| EP | 1 566 743 | 8/2005 |
| EP | 1566948 | 8/2005 |
| EP | 1 372 133 | 12/2005 |
| EP | 1 686 496 | 8/2006 |
| GB | 2 370 208 | 6/2002 |
| GB | 2384399 | 7/2003 |
| JP | 59-023610 | 2/1984 |
| JP | 03-228490 | 10/1991 |
| JP | 04-243386 | 8/1992 |
| JP | 6-96520 | 4/1994 |
| JP | 8-235774 | 9/1996 |
| JP | 9-50676 | 2/1997 |
| JP | 9-259532 | 10/1997 |
| JP | 2000-90651 | 3/2000 |
| JP | 2000-224099 | 8/2000 |
| JP | 2000-285643 | 10/2000 |
| JP | 2000-299834 | 10/2000 |
| JP | 2000-311352 | 11/2000 |
| JP | 2000-339864 | 12/2000 |
| JP | 2001-236286 | 8/2001 |
| JP | 2001-312338 | 11/2001 |
| JP | 2002-076977 | 3/2002 |
| JP | 2002-175467 | 6/2002 |
| JP | 2003-188792 | 7/2003 |
| JP | 2003-259333 | 9/2003 |
| JP | 2003-319365 | 11/2003 |
| JP | 2004-021720 | 1/2004 |
| JP | 2004-219731 | 8/2004 |
| JP | 2004-220420 | 8/2004 |
| KR | 10-2001-0076508 | 8/2001 |
| WO | WO 95/16950 | 6/1995 |
| WO | WO 98/17032 | 4/1998 |
| WO | WO 99/28813 | 6/1999 |
| WO | WO 00/22820 | 4/2000 |
| WO | WO 01/33569 | 5/2001 |
| WO | WO 01/65413 | 9/2001 |
| WO | WO 01/67753 | 9/2001 |
| WO | WO 02/25610 | 3/2002 |
| WO | WO 03/023786 | 3/2003 |
| WO | WO 03/036457 | 5/2003 |
| WO | WO 03/067202 | 8/2003 |
| WO | 2004/061850 A1 | 7/2004 |
| WO | WO 2004/055637 | 7/2004 |
| WO | WO2004/084413 A2 | 9/2004 |
| WO | WO 2004/104815 | 12/2004 |
| WO | WO 2005/031737 | 4/2005 |
| WO | WO 2005031737 A1 * | 4/2005 |
| WO | WO 2005/048644 | 5/2005 |
| WO | WO 2005/008505 | 7/2005 |
| WO | WO 2005/109781 | 11/2005 |
| WO | WO 2006/040737 | 4/2006 |
| WO | WO 2006071364 | 6/2006 |

OTHER PUBLICATIONS

Kadir A. Peker et al., "Adaptive Fast Playback-Based Video Skimming Using a Compressed-Domain Visual Complexity Measure," Dec. 2004, Mitsubishi Electric Research Laboratories.*

"Apple Announces iTunes 2," Press Release, Apple Computer, Inc., Oct. 23, 2001.

"Apple Introduces iTunes / World's Best and Easiest To Use Jukebox Software," Macworld Expo, San Francisco, Jan. 9, 2001.

"Apple's iPod Available in Stores Tomorrow," Press Release, Apple Computer, Inc., Nov. 9, 2001.

"Nomad Jukebox," User Guide, Creative Technology Ltd., Version 1, Aug. 2000.

"SoundJam MP Plus Manual, version 2.0" / MP3 Player and Encoder for Macintosh by Jeffrey Robbin, Bill Kincaid and Dave Heller, manual by Tom Negrino, published by Casady & Greene, Inc., 2000.

"12.1" 925 Candela Mobile PC", downloaded from LCDHardware. com on Dec. 19, 2002, http://www.lcdharware.com/panel/12_1_panel/default.asp.

"BL82 Series Backlit Keyboards", www.tg3electronics.com/products/backlit/backlit.htm, downloaded Dec. 19, 2002.

"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.

"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].

"Digital Still Cameras—Downloading Images to a Computer," Mimi Chakarova et al., Multi/Media Reporting and Convergence, 2 pgs.

"Eluminx Illuminated Keyboard", downloaded Dec. 19, 2002, http://www.elumix.com/.

"How To Pair a Bluetooth Headset & Cell Phone", About.com; downloaded on Apr. 29, 2006 from http://mobileoffice.about.com/od/usingyourphone/ht/blueheadset_p.htm.

"Peripherals for Industrial Keyboards & Pointing Devices", Stealth Computer Corporation, downloaded on Dec. 19, 2002, http://www.stealthcomputer.com/peropherals_oem.htm.

"Poly/Optical Fiber Optic Membrane Switch Backlighting", downloaded Dec. 19, 2002, http://www.poly/optical.com/membrane_switches.html.

"Public Safety Technologies Tracer 2000 Computer", downloaded Dec. 19, 2002, http://www.pst911.com/traver.html.

"Rocky Matrix Backlit Keyboard", downloaded Dec. 19, 2002, http://www.amrel.com/asi_matrixkeyboard.html.

"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg.jsp?cc=global&lc=en&ver=4001&template=pc3_1_1 &z....

"TAOS, Inc., Announces Industry's First Ambient Light Sensor to Convert Light Intensity to Digital Signals", www.taosinc.com/pressrelease_090902.htm, downloaded Jan. 23, 2003.

"Toughbook 28: Powerful, Rugged and Wireless", Panasonic: Toughbook Models, downloaded Dec. 19, 2002, http:www.panasonic.com/computer/notebook/html/01a_s8.htm.

"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.

"WhyBuy: Think Pad", IBM ThinkPad Web Page Ease of Use, downloaded on Dec. 19, 2002, http://www.pc.ibm.com/us/thinkpad/easeofuse.html.

512MB Waterproof MP3 Player with FM Radio & Built/in Pedometer, Oregon Scientific, downloaded on Jul. 31, 2006 from http://www2.oregonscientific.com/shop/product.asp?cid=4&scid=11&pid=581.

Adam C. Engst, "SoundJam Keeps on Jammin'," Jun. 19, 2000, http://db.tidbits.com/getbits.acgi?tbart=05983.

Alex Veiga, "AT&T Wireless Launching Music Service," Yahoo! Finance, Oct. 5, 2004, pp. 1/2.

Andrew Birrell, "Personal Jukebox (PJB)," Oct. 13, 2000, http://birrell.org/andrew/talks/pjb/overview.ppt.

Apple iPod Technical Specifications, iPod 20GB and 60GB Mac + PC, downloaded from http://www.apple.com/ipod/color/specs.html on Aug. 8, 2005.

Bociurkiw, Michael, "Product Guide: Vanessa Matz,", www.forbes.com/asap/2000/1127/vmartz_print.html, Nov. 27, 2000.

Compaq, "Personal Jukebox," Jan. 24, 2001, http://research.compaq.com/SRC/pjb/.

Creative: "Creative NOMAD MuVo TX," www.creative.com, Nov. 1, 2004, http://web.archive.org/web/20041024175952/www.creative.com/products/pfriendly.asp?product=9672 [downloaded Jun. 6, 2006].

Creative: "Creative NOMAD MuVo," www.creative.com, Nov. 1, 2004, http://web.archive.org/web/20041024075901/www.creative.com/products/product.asp?category=213&subcategory=215&product=110 [downloaded Jun. 7, 2006].

Creative: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].

De Herrera, Chris, "Microsoft ActiveSync 3.1," Version 1.02, Oct. 13, 2000.

iAP Sports Lingo 0x09 Protocol V1.00, May 1, 2006.

IEEE 1394—Wikipedia, 1995, http://www.wikipedia.org/wiki/Firewire.

Written Opinion of the International Searching Authority dated Nov. 24, 2006 in PCT Application No. PCT/US2005/046797.

International Search Report dated Feb. 4, 2003 in corresponding application No. PCT/US2002/033330.

International Search Report dated Jul. 10, 2007 in corresponding application No. PCT/US2006/048738.

International Search Report dated Apr. 5, 2006 from corresponding International Application No. PCT/US2005/038819.

International Search Report dated Jul. 2, 2007 in relased case PCT/US2006/048669.

International Search Report dated May 21, 2007 from corresponding PCT Application No. PCT/US2006/048670.

International Search Report in corresponding European Application No. 06256215.2 dated Feb. 20, 2007.

Invitation to Pay Additional Fees and Partial Search Report for corresponding PCT Application No. PCT/US2005/046797 dated Jul. 3, 2006.

iTunes 2, Playlist Related Help Screens, iTunes v2.0, Apple Computer, Inc., Oct. 23, 2001.

iTunes, Playlist Related Help Screens, iTunes v1.0, Apple Computer, Inc., Jan. 2001.

Jabra Bluetooth Headset User Manual; GN Netcom A/s, 2005.

Jabra Bluetooth Introduction; GN Netcom A/S, Oct. 2004.

Jabra FreeSpeak BT200 User Manual; Jabra Corporation, 2002.

Kennedy, "Digital Data Storage Using Video Disc," IBM Technical Disclosure Bulletin, vol. 24, No. 2, Jul. 1981.

Miniman, "Applian Software's Replay Radio and Player v1.02," Product review, pocketnow.com, http://www.pocketnow.com/reviews/replay/replay.htm, Jul. 31, 2001.

Musicmatch, "Musicmatch and Xing Technology Introduce Musicmatch Jukebox," May 18, 1998, http://www.musicmatch.com/info/company/press/releases/?year=1998&release=2.

Nonhoff/Arps, et al., "Straßenmusik Portable MP3/Spieler mit USB/Anschluss," CT Magazin Fuer Computer Technik, Verlag Heinz Heise GMBH, Hannover DE, No. 25, Dec. 4, 2000.

International Search Report dated Nov. 24, 2006 in PCT Application No. PCT/US2005/046797.

Personal Jukebox (PJB), "Systems Research Center and PAAD," Compaq Computer Corp., Oct. 13, 2000, http://research.compaq.com/SRC/pjb/.

Peter Lewis, "Two New Ways to Buy Your Bits," CNN Money, Dec. 31, 2003, pp. 1/4.

Sastry, Ravindra Wadali. "A Need for Speed: A New Speedometer for Runners", submitted to the Department of Electrical Engineering and Computer Science at the Massachusetts Institute of Technology, May 28, 1999.

Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208/212.

SoundJam MP Plus, Representative Screens, published by Casady & Greene, Inc., Salinas, CA, 2000.

Specification Sheet, iTunes 2, Apple Computer, Inc., Oct. 31, 2001.

Spiller, Karen. "Low/decibel earbuds keep noise at a reasonable level", The Telegraph Online, dated Aug. 13, 2006, http://www.nashuatelegraph.com/apps/pbcs.dll/articie?Date=20060813&Cate.. Downloaded Aug. 16, 2006.

Steinberg, "Sonicblue Rio Car," Product Review, Dec. 12, 2000, http://electronics.cnet.com/electronics/0/6342420/1304/4098389.html.

Travis Butler, "Archos Jukebox 6000 Challenges Nomad Jukebox," Aug. 13, 2001, http://db.tidbits.com/getbits.acgi?tbart=06521.

Travis Butler, "Portable MP3: The Nomad Jukebox," Jan. 8, 2001, http://db.tidbits.com/getbits.acgi?tbart=06261.

Waterproof Music Player with FM Radio and Pedometer User Manual, Oregon Scientific, 2005.

"Creative liefert erstes Portable Media Center aus" [Online] Sep. 2, 2004, Retrieved from the internet on Sep. 20, 2007 from http://www.golem.de/0409/33347.html>.

Apple iTunes Smart Playlists, downloaded Apr. 5, 2005 from http://web.archive.org/web/20031002011316/www.apple.com/itunes/smartplaylists.... pp. 1-2.

International Search Report dated Dec. 5, 2007 in PCT Application No. PCT/US2007/004810.

International Search Report dated Feb. 18, 2008 in Patent Application No. PCT/US2007/079766.

International Search Report Dated Sep. 27, 2007 in Application No. 05824296.7.

International Search Report in Patent Application No. PCT/US2006/048738 dated Jan. 29, 2008.

International Search Report in Patent Application No. PCT/US2007/077020 dated Jan. 28, 2008.

International Search Report in Patent Application No. PCT/US2007/076889 dated Jan. 28, 2008.

iTunes, Wikipedia, the free encyclopedia; downloaded on Oct. 5, 2005, pp. 1-6.

Nutzel et al., "Sharing Systems for Future HiFi Systems", The Computer Society, Jun. 2004.

Office Action dated Feb. 20, 2008 in Japanese Application No. 2007-538196.

Office Action dated Feb. 25, 2008 in U.S. Appl. No. 11/749,599.

Office Action Dated Feb. 4, 2008 in U.S. Appl. No. 11/566,072.

Office Action dated Mar. 4, 2008 from U.S. Appl. No. 10/973,657.

Partial International Search Report dated Feb. 1, 2008 in Patent Application No. PCT/US2007/010630.

Partial Search Report dated Sep. 6, 2007 in PCT Application No. PCT/US2007/004810.

Written Opinion dated Dec. 5, 2007 in PCT Application No. PCT/US2007/004810.

Written Opinion dated Feb. 18, 2008 in Patent Application No. PCT/US2007/079766.

Written Opinion in Patent Application No. PCT/US2006/048738 dated Jan. 29, 2008.
Written Opinion in Patent Application No. PCT/US2007/076889 dated Jan. 28, 2008.
Written Opinion in Patent Application No. PCT/US2007/077020 dated Jan. 28, 2008.
Search Report dated Mar. 20, 2008 in Patent Application No. PCT/US2007/077789.
Written Opinion dated Mar. 20, 2008 in Patent Application No. PCT/US2007/077789.
Invitation to Pay Additional Fees and Partial Search Report for PCT Application No. PCT/US2007/077160 dated Apr. 1, 2008.
"Combination Belt Clip Leaf Spring and Housing Latch", Wandt et al.; Motorola Technical Developments, Motorla Inc. Schaumburg, IL. vol. 18, Mar. 1, 1993.
Notification of Reason for Rejection from PCT Application No. 2003-539048 dated Nov. 27, 2007.
Office Action dated Jun. 17, 2008 in U.S. Appl. No. 11/212,313.
Office Action dated May 30, 2008 in Chinese Patent Application No. 02825938.6.
International Search Report dated Jun. 10, 2008 in PCT Application No. PCT/US2007/010630.
Written Opinion dated Jun. 10, 2008 in PCT Application No. PCT/US2007/010630.
Search Report dated May 15, 2008 in PCT Application No. PCT/US2007/019578.
Written Opinion dated May 15, 2008 in PCT Application No. PCT/US2007/019578.
"Creative Zen Vision: M 30GB", Dec. 21, 2005; downloaded on Jan. 11, 2008 from http://web.archive.org/web/20051221050140/http://www.everthingusb.com/creative_zen_vision:m_30gb.html>.
Yee et al., "Faceted Metadata for Image Search and Browsing." Association For Computing Machinery, Conference Proceedings, Apr. 5, 2003.
International Search Report dated Jul. 7, 2008 in PCT Application No. PCT/US2007/076793.
Written Opinion dated Jul. 7, 2008 in PCT Application No. PCT/US2007/076793.
Office Action dated Apr. 4, 2008 in U.S. Appl. No. 11/212,555.
Office Action in U.S. Appl. No. 11/212,555 dated Aug. 14, 2008.
Office Action in Japanese Patent Application No. 2008-045351 dated Aug. 12, 2008.
Office Action in European Patent Application No. 05 855 368.6 dated Nov. 20, 2008.
Office Action dated Dec. 15, 2008 in U.S. Appl. No. 11/212,313.
Notice of Allowance dated Dec. 18, 2008 in U.S. Appl. No. 11/212,555.
International Search Report dated Oct. 10, 2008 in PCT Application No. PCT/US2007/077160.
Written Opinion dated Oct. 10, 2008 in PCT Application No. PCT/US2007/077160.
Office Action dated Jan. 26, 2009 in U.S. Appl. No. 11/373,468.
Office Action dated Sep. 1, 2008 in EP Application No. 06 256 215.2.
Written Opinion dated Jan. 6, 2009 in Singapore Application No. 0701865-8.
Office Action dated Mar. 30, 2009 in U.S. Appl. No. 11/515,270.
Office Action dated Apr. 9, 2009 in U.S. Appl. No. 11/583,199.
Office Action dated May 11, 2009 in U.S. Appl. No. 11/680,580.
International Search Report dated Jun. 19, 2007 in related Application PCT/US2006/048753.
"QuickTime Overview", Apple Computer, Inc., Aug. 11, 2005.
"QuickTime Movie Playback Programming Guide", Apple Computer, Inc., Aug. 11, 2005.
U.S. Appl. No. 11/621,544, "Personalized Podcasting/Podmapping", filed Jan. 9, 2007.
U.S. Appl. No. 11/621,541, "Personalized Podcasting Podmapping" filed Jan. 9, 2007.

* cited by examiner

PORTABLE MEDIA DEVICE WITH VIDEO ACCELERATION CAPABILITIES

BACKGROUND OF THE INVENTION

1. Field of the Invention

The invention relates to media devices and, more particularly, to playing of media on media devices.

2. Description of the Related Art

Conventionally, video players are able to output video to a display device. Video players can be software applications operating on a personal computer or a specialized electronic device, such as a DVD player. These video players allow a user to playback a video. In addition, these video players allow other functions, such as fast forward and rewind operations, to be invoked by their user. Unfortunately, however, these conventional video players are not well suited for portable media devices being battery-powered and having limited processing capacity. Thus, there is a need for improved techniques for presenting video on portable media players.

SUMMARY OF THE INVENTION

The invention relates to improved techniques for performing accelerated video presentation on a media device. The improved techniques enable smooth, uniform accelerated video presentation by displaying key frames from a video file in a periodic fashion. The rate and direction of accelerated video presentation can be controlled.

The invention is well suited for use with portable media devices. The portable media devices can, for example, be battery-powered media playback devices. The battery-powered media playback devices can be highly portable, such as handheld or pocket-sized media players.

The invention can be implemented in numerous ways, including as a method, system, device, apparatus, or computer readable medium. Several embodiments of the invention are discussed below.

As a method for presenting video in an accelerated manner, one embodiment of the invention includes at least the acts of: receiving a request for accelerated presentation of a video, the video including a plurality of frames stored in a video file, some of the frames being key frames; identifying, after receiving the request, a next key frame in the video file for the video; retrieving the identified next key frame of the video file; and presenting the identified next key frame of the video.

As a method for playing a video on a media playback device in an accelerated manner, where the media playback device has a display device, one embodiment of the invention includes at least the acts of: determining a next key frame in a video file for the video; identifying a storage location and at least one attribute of the next key frame; retrieving the next key frame based on the storage location and the at least one attribute; decoding the next key frame; and outputting the decoded key frame to the display device.

As a media playback device, one embodiment of the invention includes at least: a media store that stores video files, the video files including frames, and at least some of the frames are key frames; a processor capable of processing video concerning at least one of the video files in an accelerated manner by successively providing key frames of the at least one of the video files; an output device; and a decoder configured to receive the frames of the video from the processor and to output video presentation information to the output device.

As a media playback device, another embodiment of the invention includes at least: a user input device configured to receive a user video acceleration input; a media store that stores video files, the video files including frames, and at least some of the frames are key frames; a key frame table capable of storing key frame information pertaining to at least a plurality of the key frames of the video file; a processor capable of processing video concerning at least one of the video files in an accelerated manner in response to the user video acceleration input, the processor operates to process the video by successively outputting key frames of the video file associated with the video; an output device; and a decoder configured to receive the frames of the video from the processor and output video presentation information to the output device.

As a computer readable medium including at least computer program code for presenting video in an accelerated manner, one embodiment of the invention includes at least: computer program code for receiving a request for accelerated presentation of a video, the video including a plurality of frames stored in a video file, some of the frames being key frames; computer program code for identifying, after receiving the request, a next key frame in the video file for the video; computer program code for retrieving the identified next key frame of the video file; and computer program code for presenting the identified next key frame of the video.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved techniques for performing accelerated video presentation on a media device. The improved techniques enable smooth, uniform accelerated video presentation by displaying key frames from a video file in a periodic fashion. The rate and direction of accelerated video presentation can be controlled.

The invention is well suited for use with portable media devices. The portable media devices can, for example, be battery-powered media playback devices. The battery-powered media playback devices can be highly portable, such as handheld or pocket-sized media players.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
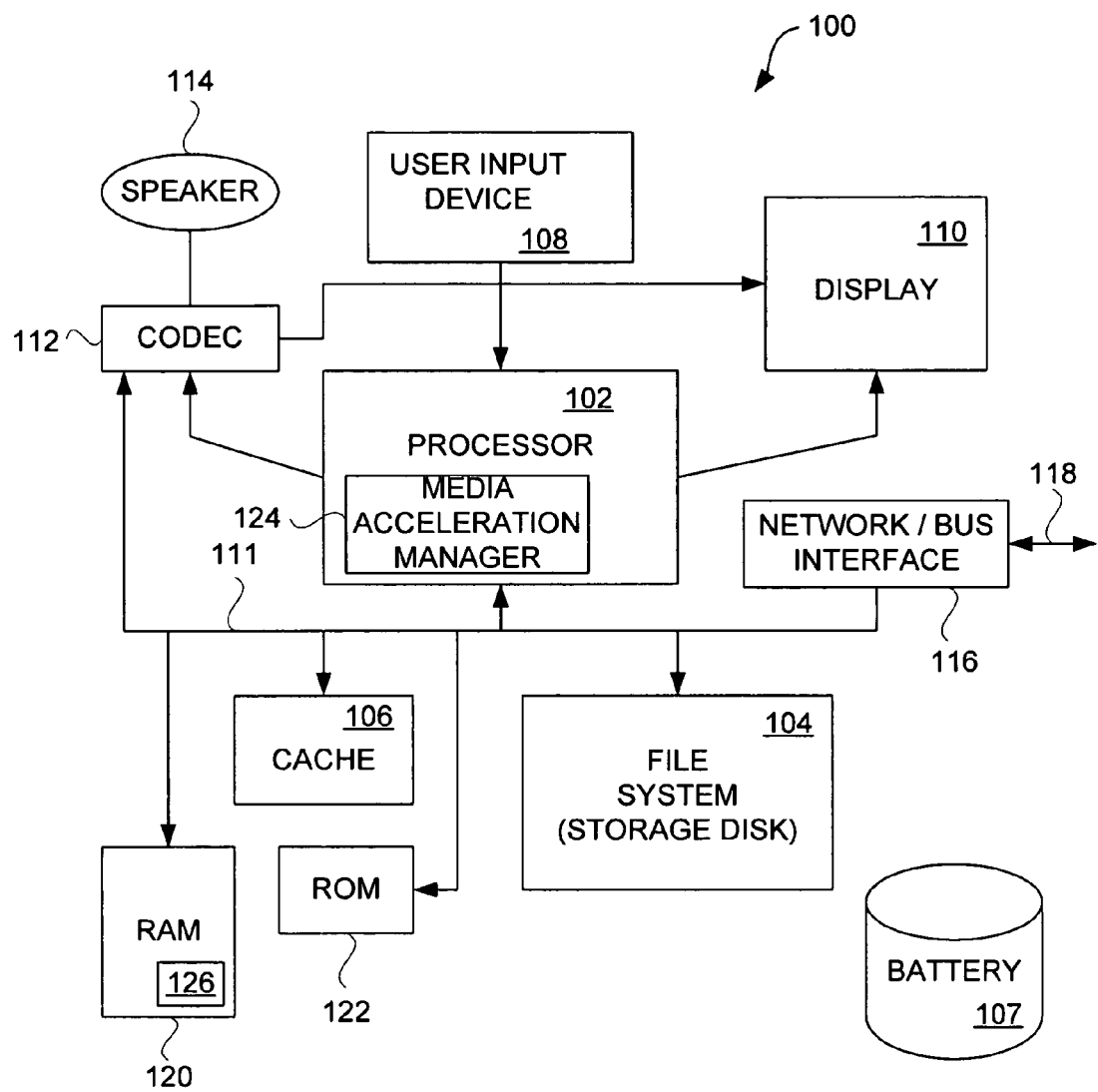
FIG. 1 is a block diagram of a media player according to one embodiment of the invention.

FIG. 1 is a block diagram of a media player 100 according to one embodiment of the invention. The media player 100 includes a processor 102 that pertains to a microprocessor or controller for controlling the overall operation of the media player 100. The media player 100 stores media data pertaining to media items in a file system 104. More particularly, media files for the media items are stored in the file system 104. The file system 104 is, typically, a mass storage device, such as a storage disk or a plurality of disks. The file system 104 typically provides high capacity storage capability for the media player 100. The file system 104 can store not only media data but also non-media data (e.g., when operated in a disk mode). However, since the access time to the file system 104 is relatively slow, the media player 100 can also include a cache 106 (cache memory). The cache 106 is, for example, Random-Access Memory (RAM) provided by semiconductor memory. The relative access time to the cache 106 is substantially shorter than for the file system 104. However, the cache 106 does not have the large storage capacity of the file system 104. Further, the file system 104, when active, consumes substantially more power than does the cache 106. Since the media player 100 is normally a portable media player that is powered by a battery 107, power consumption is a general concern. Hence, use of the cache 106 enables the file system 104 to be inactive or off more often than if no cache 106 were used, thereby reducing power consumption of the portable media player.

The media player 100 also includes a user input device 108 that allows a user of the media player 100 to interact with the media player 100. For example, the user input device 108 can take a variety of forms, such as a button, keypad, dial, etc. Still further, the media player 100 includes a display 110 (screen display) that can be controlled by the processor 102 to display information to the user. A data bus 111 can facilitate data transfer between at least the file system 104, the cache 106, the processor 102, and a coder/decoder (CODEC) 112.

In one embodiment, the media player 100 serves to store a plurality of media items (e.g., videos) in the file system 104. When a user desires to have the media player 100 play a particular media item, a list of available media items can be displayed on the display 110. Then, using the user input device 108, a user can select one of the available media items. Upon receiving a selection of a particular media item, the media data (e.g., video file) for the particular media item is accessed by the processor 102 and then supplied to a coder/decoder (CODEC) 112. In the case of video and audio output, the CODEC 112 produces video output signals for the display 110 (or a display driver) and produces analog output signals for a speaker 114 (in this case the CODEC 112 can include one CODEC for audio and another CODEC for video). The speaker 114 can be a speaker internal to the media player 100 or external to the media player 100. For example, headphones or earphones that connect to the media player 100 would be considered an external speaker.

The media player 100 also includes a network/bus interface 116 that couples to a data link 118. The data link 118 allows the media player 100 to couple to a host computer. The data link 118 can be provided over a wired connection or a wireless connection. In the case of a wireless connection, the network/bus interface 116 can include a wireless transceiver.

Further, the media player 100 also includes a RAM 120 and a Read-Only Memory (ROM) 122. The ROM 122 can store programs, utilities or processes to be executed in a non-volatile manner. The ROM 122 can be implemented such that it is re-programmable, e.g., using EEPROM or FLASH technologies. The RAM 120 provides volatile data storage, such as for the cache 106.

Moreover, the processor 102 includes a media acceleration manger 124. The media acceleration manager 124 manages acceleration of the output of media items. Typically, the media items are videos, thus the accelerated output presents select video images from the file system 104 or the cache 106 onto the display 110 in an accelerated manner. More specifically, among other things, the media acceleration manager 124 determines when and what video images are presented on the display 110. For example, based on a user selection to accelerate media (i.e., video) output, the media acceleration manager 124 determines the appropriate frames of the video file to be output and then supplies such frames with appropriate timing to the CODEC 112 which decodes the frames for display on the display 110. The frames being processed by the media acceleration manager 124 or the processor 102 are typically retrieved from the cache 106, though they could also be retrieved from the file system 104. To facilitate the display of accelerated media (i.e., video), a key frame table 126 can be provided. In one embodiment, the key frame table 126 is stored in a portion of the RAM 120. The key frame table 126 can be used to assist the processor 102 in identifying those frames of a video file that are key frames which, as discussed below, are used to display accelerated media.

Figure 2:
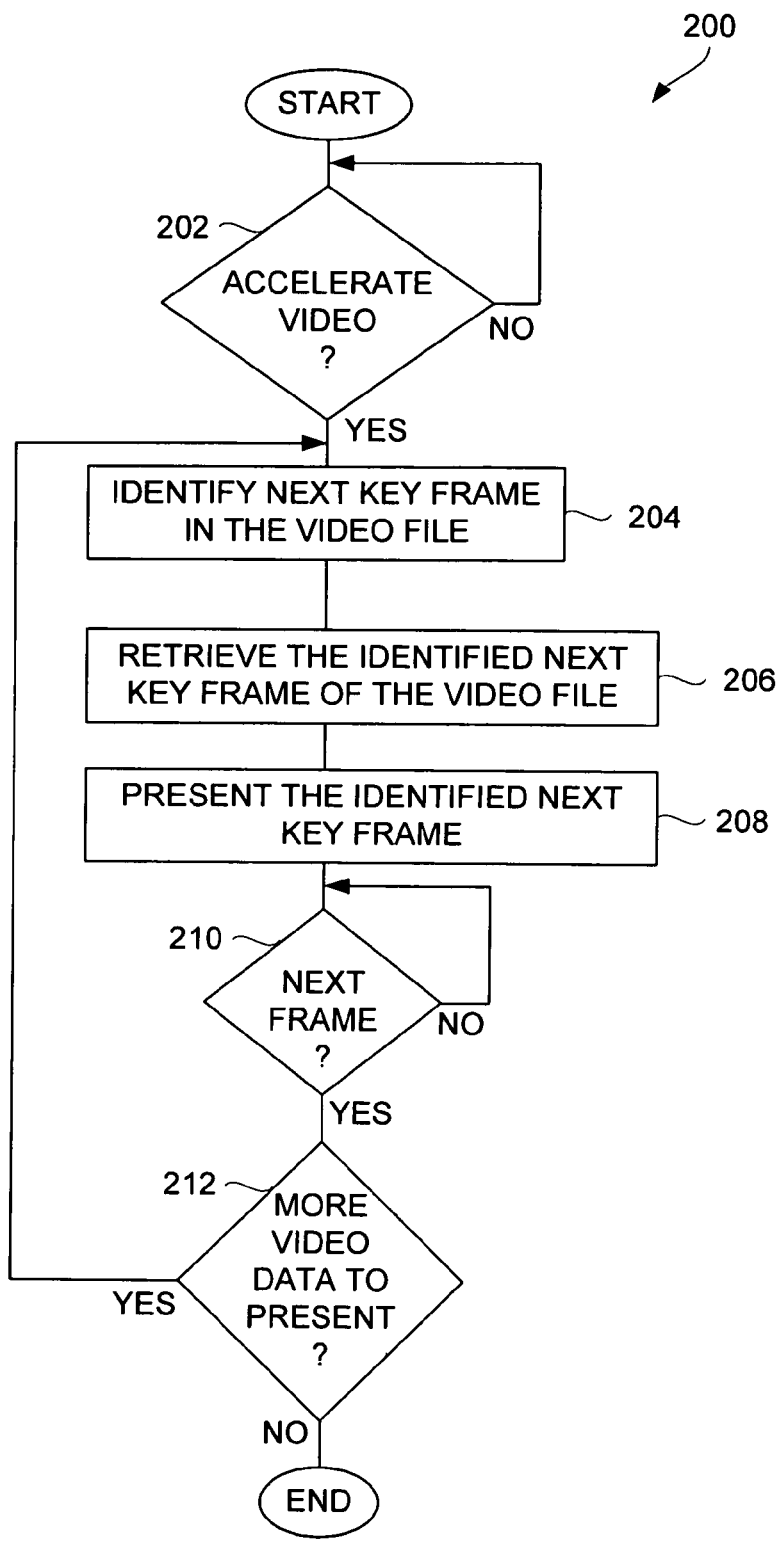
FIG. 2 is a flow diagram of a video acceleration process according to one embodiment of the invention.

FIG. 2 is a flow diagram of a video acceleration process 200 according to one embodiment of the invention. The video acceleration process 200 is, for example, performed by a media device, such as the media device 100 illustrated in FIG. 1.

The video acceleration process 200 typically operates while a video is playing on the media device. The media device will typically have a display screen that displays images pertaining to the video. While the video is playing, at its normal speed, the video acceleration process 200 determines whether the video playback is to be accelerated. Typically, a user will interact with the media device to signal a request for acceleration of the video playback. As an example, the user can press a "fast forward" or "rewind" button to request accelerated video playback.

When the decision 202 determines that the video playback should not accelerate, then the video can continue to play at its normal rate. However, when the decision 202 determines that the video playback should accelerate, a next key frame in the video file pertaining to the video is identified 204. The video file pertaining to the video includes a number of frames, some of these frames are key frames. Key frames are complete image frames, whereas other frames are typically incomplete or partial frames. Key frames can also be referred to as independent frames (or I frames). The video file, for example, can pertain to an MPEG format. Exemplary video formats include H.264 and MPEG4.

After the next key frame in the video file has been identified 204, the identified next key frame of the video file can be retrieved 206. The identified next key frame can be retrieved 206 from a data storage device. The data storage device can be a disk drive, random access memory (e.g., FLASH memory), or cache memory associated with the disk drive. In any case, after the identified next key frame is retrieved 206, the identified next key frame can be presented 208. In the case of video playback, the identified next key frame can be presented 208 by displaying the identified next key frame on a display device.

Next, a decision 210 determines whether a next frame should be presented. When the decision 210 determines that a next frame should not yet be presented, the video acceleration process 200 awaits until the appropriate time to present the next video frame. The timing associated with the decision 210 affects the degree of acceleration of the video playback.

Delaying the presentation of a next frame of the video for a shorter duration increases acceleration provided during video playback, whereas delaying for a longer duration would slow the acceleration during video playback. In one implementation, in accordance with a predetermined time, the decision 210 allows for the video acceleration process 200 to periodically present successive next key frames of the video file. Once the decision 210 determines that a next frame should be presented, a decision 212 determines whether there is additional video data to be presented. When the decision 210 determines that there is no more video data to be presented, the video acceleration process 200 ends. On the other hand, when the decision 212 determines that there is additional video to be presented, the video acceleration process 200 returns to repeat the block 204 and subsequent blocks so that the video acceleration process 200 can continue with processing of a next key frame in a similar fashion. Consequently, successive key frames in the video file are able to be directly and successively presented on a display device during an acceleration mode for video playback.

In another example, the decision 212 could determine not to continue the video acceleration process 200 when accelerated video playback is no longer desired. For example, a user may request that the accelerated video playback stop completely or return to its normal playback rate. In such cases, the decision 212 can determine to end the video acceleration process 200, in which case the video playback rate would return to its normal rate or the video playback would altogether stop depending upon the user's request.

Figure 3:
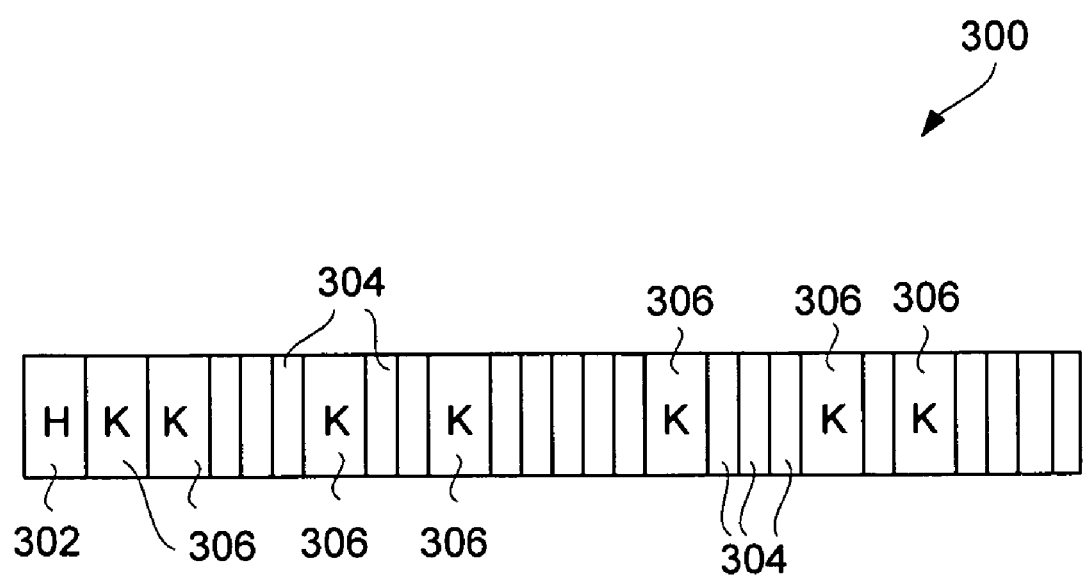
FIG. 3 is a diagram of a representative video format.

FIG. 3 is a diagram of a representative video format 300. The representative video format 300 includes a header (H) 302 and series of frames 304. Certain ones of the frames 304 are key frames (K) 306. As noted above, according to one embodiment of the invention, the key frames 306 within the video format 300 can be identified and retrieved and thereafter utilized in presenting video playback in an accelerated manner.

FIGS. 4-7 are flow diagrams concerning a more particular implementation of accelerated video playback. The playback of video in an accelerated manner can correspond to a fast forward operation or a rewind operation.

Figure 4:
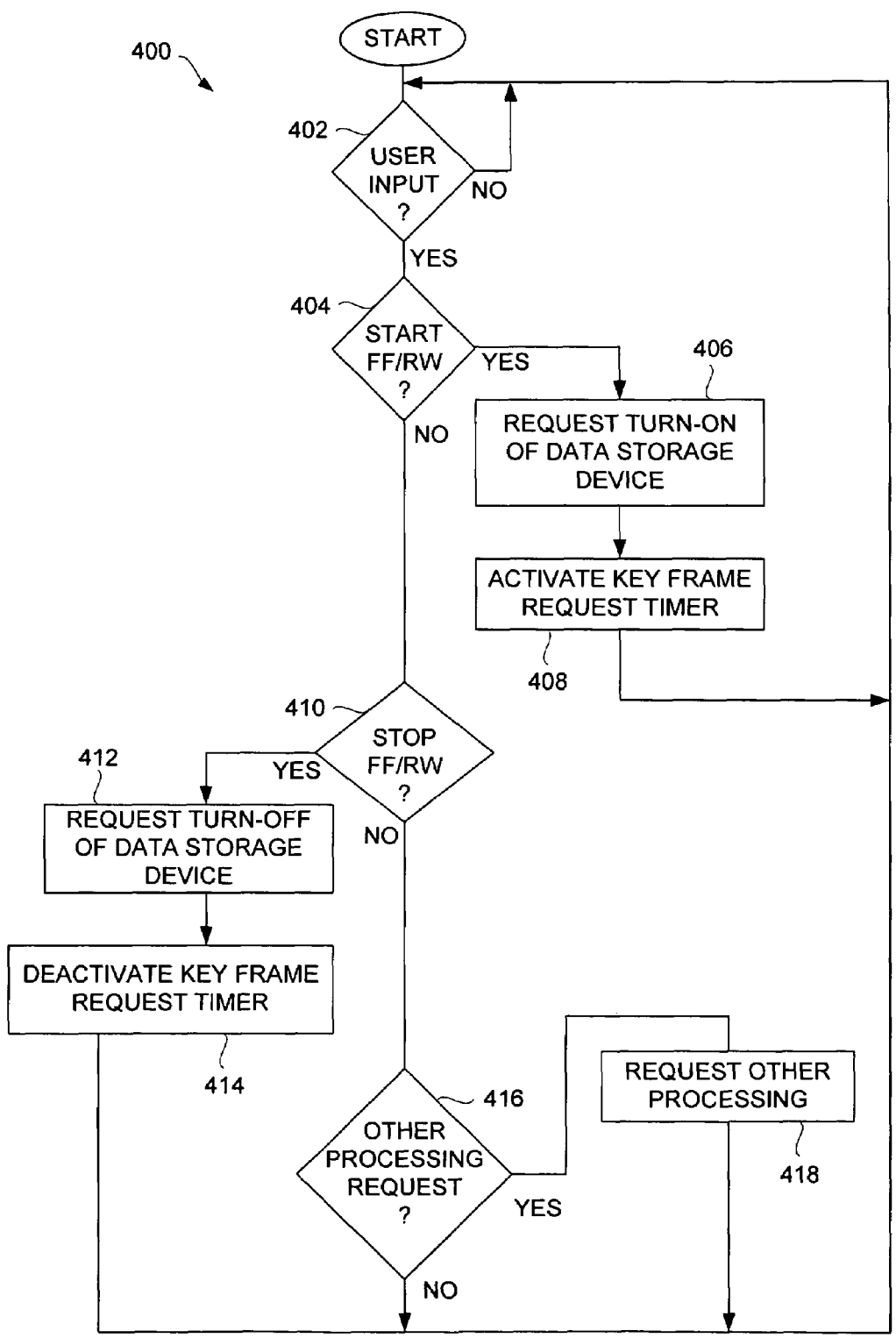
FIG. 4 is a flow diagram of a user input process according to one embodiment of the invention.

FIG. 4 is a flow diagram of a user input process 400 according to one embodiment of the invention. The user input process 400 is, for example, performed by a media device, such as the media device 100 illustrated in FIG. 1.

The user input process 400 begins with a decision 402. The decision 402 determines whether a user input has been received. When the decision 402 determines that a user input has not been received, then the user input process 400 awaits such an input. Once the decision 402 determines that a user input has been received, a decision 404 determines whether the user input corresponds to a request for a fast forward (FF) or rewind (RW) operation. When the decision 404 determines that the user input is requesting to initiate a fast forward or a rewind operation, turn-on of a data storage device is requested 406. For example, in one embodiment, the data storage device is a hard disk storage device. A hard disk storage device can store large amounts of data but typically has a significant startup delay (relative to video processing rates) before data can be accessed on the hard disk storage device. Hence, the request 406 operates to begin the process of turning-on the hard drive storage device. Here, in this embodiment, it is assumed that the data storage device will need to be accessed to service the request for a fast forward (FF) or rewind (RW) operation; therefore, it is enabled and initiated in advance so as be more likely ready when access to the data storage device is needed.

Next, a key frame request timer is activated 408. The key frame request timer provides a periodic software event, i.e., a key frame timer event, to trigger a presentation of a next frame of video on a display device in an accelerated manner. The key frame timer event is discussed below with reference to FIGS. 5A and 5B. The period of the key frame request timer determines the rate of acceleration. The media device, or its user, can control or influence the rate of acceleration. For example, in one embodiment, when a fast forward or rewind operation is requested by a user, the initial rate of acceleration is a first rate; then, after being operated at the first rate for a predetermined period of time, a subsequent rate of acceleration is used, with the subsequent rate being greater than the initial rate. In this example, the media device automatically increases the rate of acceleration after the predetermined period of time.

On the other hand, when the decision 404 determines that the user input is not requesting to start a fast forward or rewind operation, a decision 410 determines whether the user input is requesting to stop a fast forward or rewind operation. For example, when a fast forward or rewind operation is currently active, a user will often want to at some point stop the fast forward or rewind operation. The user can do so with a user input. When the decision 410 determines that the user input is requesting to stop a fast forward or rewind operation, turn-off of the data storage device is requested 412. Since the media device is often portable and thus battery powered, it is often preferable to have the data storage device inactive to reduce power consumption (unless needed for other purposes). The key frame request timer is also deactivated 414 since the fast forward (FF) or rewind (RW) operation is ending.

Alternatively, when the decision 410 determines that the user input is not requesting to stop a fast forward or a rewind operation, a decision 416 determines whether the user input is requesting other processing. When the decision 416 determines that the user input is requesting other processing, the other processing can be requested 418. Following any of the blocks 408, 414, 418, as well as following the decision 416 when other processing is not requested, the user input process 400 returns to repeat the decision 402 and subsequent operations so that subsequent user inputs can be similarly processed.

Figure 5A:
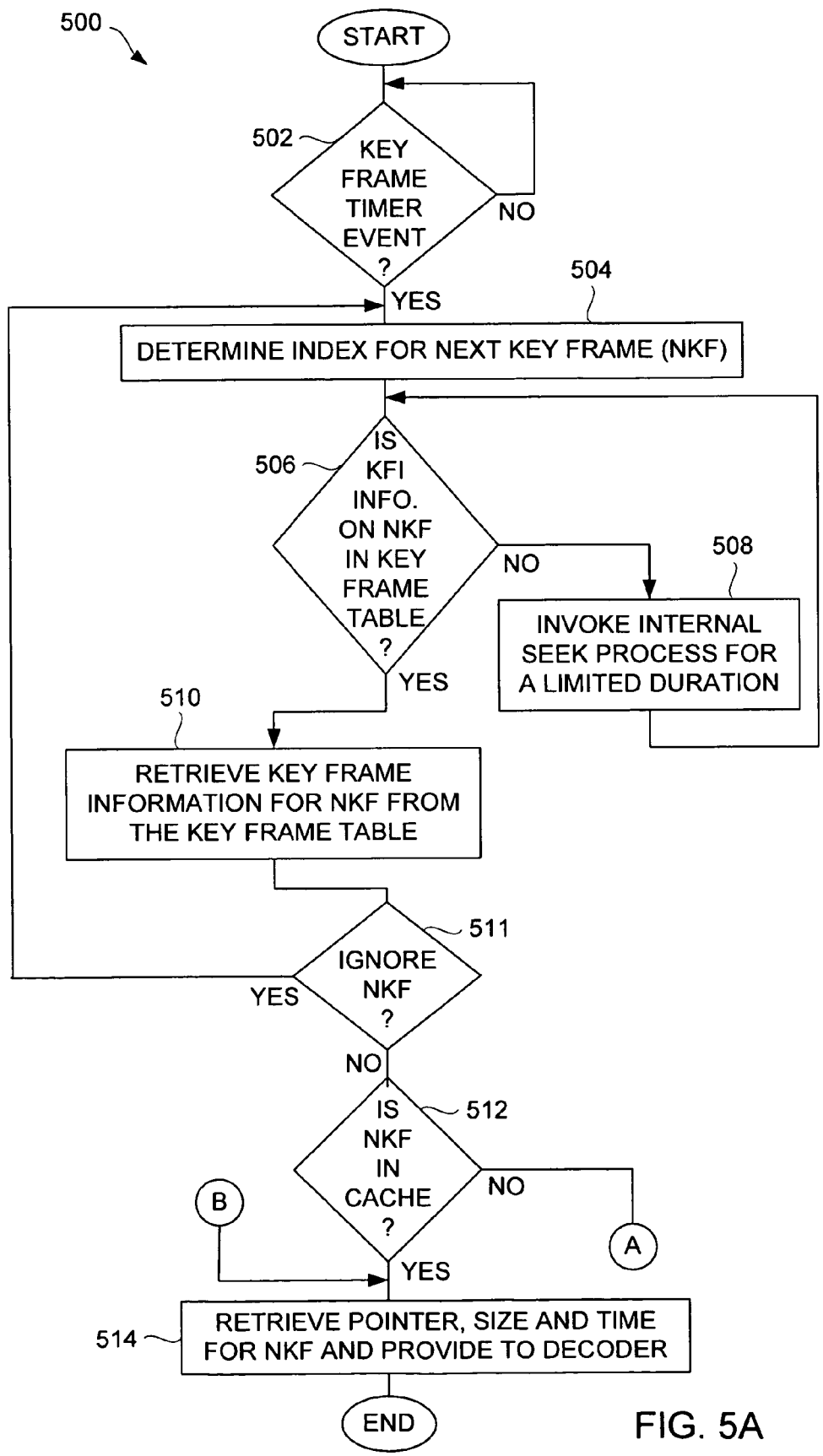
FIGS. 5A-5B are flow diagrams of a periodic frame identification process according to one embodiment of the invention.
Figure 5B:
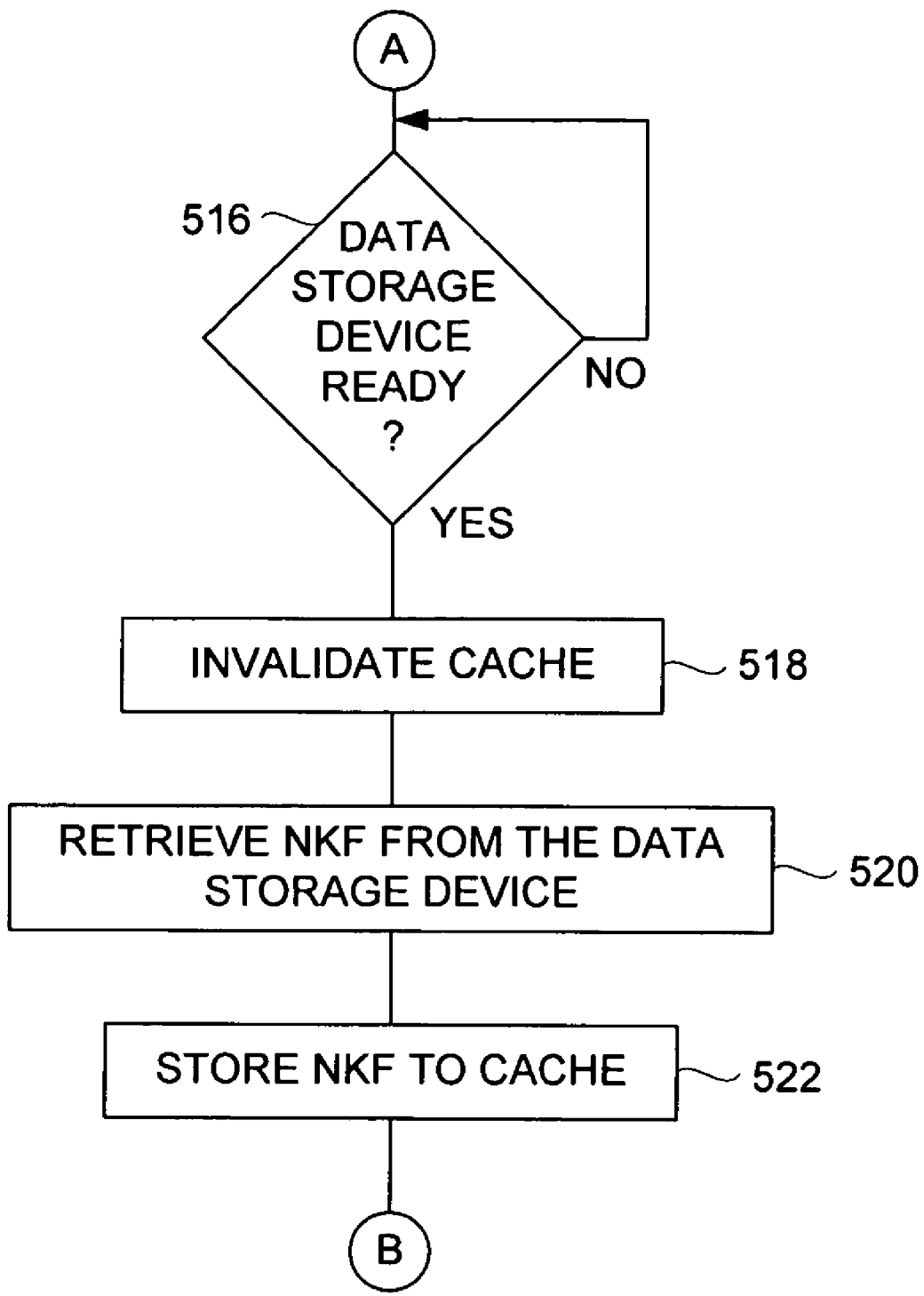

FIGS. 5A-5B are flow diagrams of a periodic frame identification process 500 according to one embodiment of the invention. The periodic frame identification process 500 is, for example, performed by a media device, such as the media device illustrated in FIG. 1.

The periodic frame identification process 500 begins with a decision 502. The decision 502 determines whether a key frame timer event has occurred. When the decision 502 determines that a key frame timer event has not occurred, then the periodic frame identification process 500 awaits such an event. In other words, the periodic frame identification process 500 is effectively invoked when a key frame timer event occurs.

In any event, when the decision 502 determines that a key frame timer event has occurred, processing is performed so that a next video frame can be presented on a display device associated with the media device. The video frame being presented is not an adjacent frame of the video, but a time-advanced frame of the video. In particular, an index for the next key frame (NKF) is determined 504. For example, the next key frame can be the key frame immediately following the previously processed key frame. As another example, the next key frame can be the key frame one or a few key frames after the previously processed key frame.

After the index for the next key frame is determined 504, a decision 506 determines whether key frame information on the next key frame is in a key frame table. As noted above, the key frame table can store information on the key frames of a video file. The key frame table is stored in memory, such as RAM, for fast access by a processor of the media device. The media device 100 illustrated in FIG. 1 includes a key frame table 126. An exemplary key frame table can include, for each key frame within the key frame table: an index or pointer (corresponding to the table entry); an offset (corresponding to an address location in a data storage device); a time (i.e., a presentation time for the key frame); and a size (i.e., frame size).

When the decision 506 determines that the key frame information for the next key frame is not currently in the key frame table, an internal seek process is invoked 508 for a limited duration. The internal seek process causes a block of the video file in the direction of accelerated playback to be processed. The processing of the block, which includes a series of frames, operates to add additional key frame information into the key frame table. The limited duration limits the time spent processing the seek operation so as to not overburden the processor of the media device, thus avoiding distortion or stalling of the video presentation. For example, the limited duration can correspond to the time to seek through ten (10) seconds of video. Additional information on the operations associated with the seek process is discussed below with reference to FIG. 7. Following the block 508, the periodic frame identification process 500 returns to repeat the decision 506 to again determine whether the key frame information on the next key frame is in the key frame table. Given that the seek process operates to add additional key frame information into the key frame table, the key frame information for the next key frame would ordinarily now be present in the key frame table.

Once the decision 506 determines that the key frame information on the next key frame is available from the key frame table, the key frame information for the next key frame is retrieved 510 from the key frame table. At this point, the periodic frame identification process 500 can optionally perform a decision 511. The decision 511 can determine whether the next key frame should be ignored. For example, in one embodiment, the decision 511 can determine whether the presentation time associated with the next key frame is far enough in advance of the presentation time of the key frame that was last output. If the next key frame is too close to the presentation time of the key frame last output (e.g., less than 2 seconds apart), the next key frame can be ignored and the periodic frame identification process 500 can return to repeat the block 504 so that a next key frame can acquired and processed.

On the other hand, if the decision 511 determines that the next key frame is not too close to the presentation time of the key frame last output, then, using at least a portion of the key frame information, a decision 512 determines whether the next key frame is in a cache. The cache is a cache memory that is associated with the data storage device, such as a hard drive storage device. The cache provides high-speed access to that portion of the data from the data storage device that is in the cache. For example, the cache can be the cache 106 illustrated in FIG. 1. When the decision 512 determines that the next key frame is in the cache, then a pointer, size and time for the next key frame are retrieved 514 from the cache and provided to a decoder. The decoder can then operate in the normal course to retrieve the video data associated with the next key frame from the data storage device, decode the retrieved video data, and output the video signals to present the video on the display device.

On the other hand, when the decision 512 determines that the next key frame is not in the cache, a decision 516 determines whether the data storage device is ready. As previously noted, the advanced turn-on of the data storage device at block 406 of the user input process 400 illustrated in FIG. 4 anticipates that the data storage device will often be needed in the presenting of media (i.e., video) in an accelerated manner. Hence, the data storage device may already be ready when needed. Hence, at the decision 516, it is determined whether the data storage device is ready (i.e., fully activated or started-up). When the decision 516 determines that the data storage device is not yet ready, the periodic frame identification process 500 waits until the device is ready. Once the data storage device is ready, the cache is at least partially invalidated 518 (i.e., current cache content is purged or available for being overwritten). Next, the next key frame is retrieved 520 from the data storage device. The next key frame is then stored 522 to the cache. Following the block 522, the periodic frame identification process 500 proceeds to perform block 514 where a pointer, size and time for the next key frame can be retrieved and provided 514 to the decoder.

Following the block 514, the periodic frame identification process 500 ends. However, it should be noted that the next time the key frame timer event occurs, the periodic frame identification process 500 would again be performed.

Accordingly, the key frame timer provides a periodic timing for retrieving and presenting a next frame of video when operating to present video in an accelerated manner. The acceleration can, for example, be due to a fast forward mode or a rewind mode of video playback. The next key frame table is utilized to enable the media device to quickly determine a next key frame that is to be retrieved and presented. In this regard, presentation of a video in an accelerated manner makes use of the key frame images within the video file. Although these key frames are not uniformly provided within video files, the periodic presentation of key frames operates to effectively present a video in an accelerated manner. The acceleration processing operates to display successive key frames with little or no regard for the timing attributes of the key frames. By controlling the rate (periodicity) of displaying next key frames, the rate of acceleration can be controlled.

In some cases, a video file might have a high percentage of key frames. According to one embodiment of the invention, metadata of a video file can be analyzed to examine the number of key frames over the duration of the video. In one implementation, so long as the key frames on average are at least two (2) seconds apart over the duration of the video, each of the key frames of the video can be utilized in an accelerated output mode (e.g., fast forward or rewind). However, if the average number of frames over the duration of the video is less than two (2) seconds apart, less than all of the key frames can be utilized when outputting video in the accelerated manner. For example, if there is a high number of key frames in the video, every other key frame could be utilized, thereby effectively reducing the number of key frames being utilized. When less than all the key frames in the video are used, the key frames are effectively subsampled.

Figure 6:
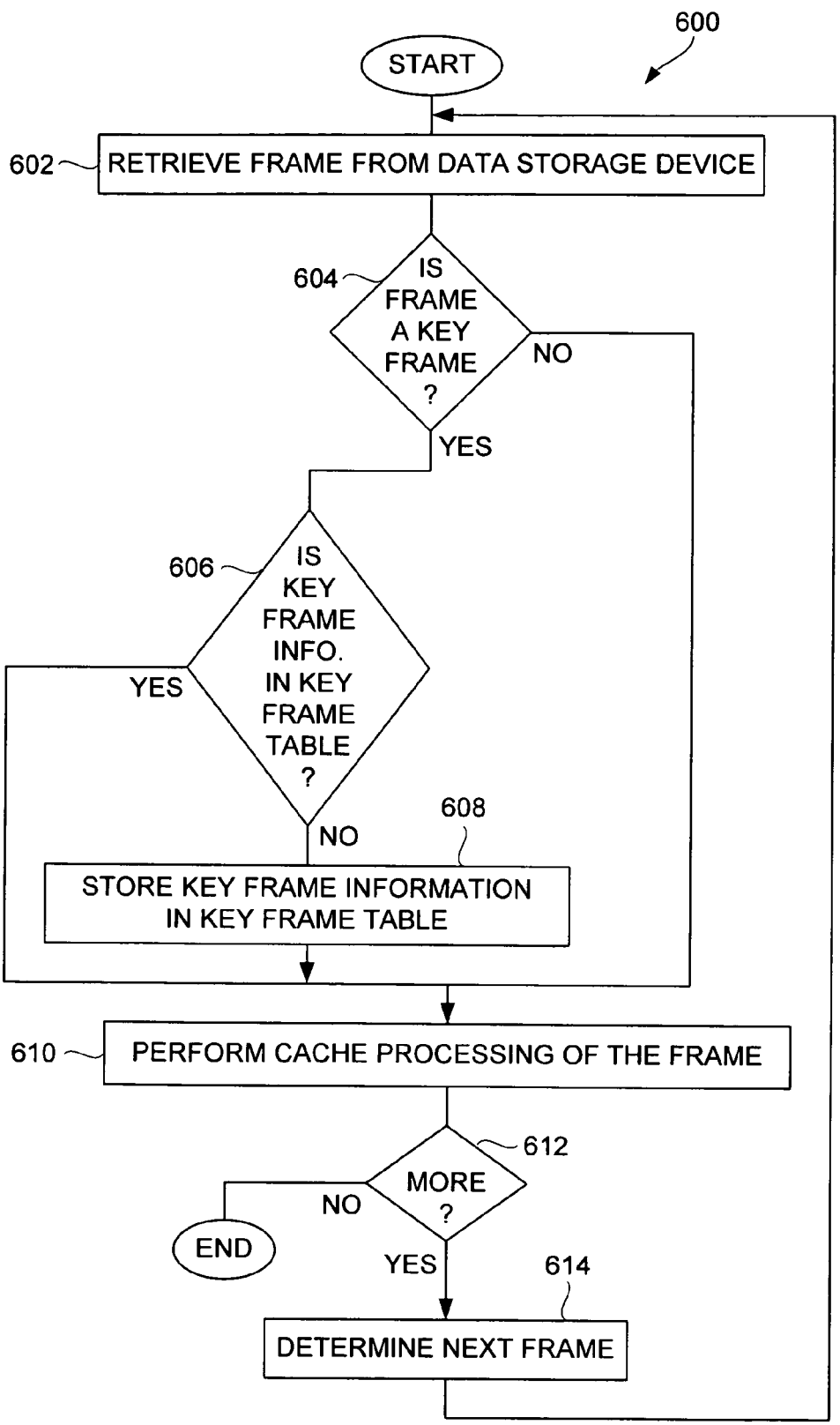
FIG. 6 is a flow diagram of a modified cache process according to one embodiment of the invention.

FIG. 6 is a flow diagram of a modified cache process 600 according to one embodiment of the invention. The modified cache process 600 concerns modifications to a conventional cache process that can be performed to facilitate utilization of a key frame table as discussed above. In other words, it is advantageous that the key frame table include key frame information for the various key frames of a video file to be presented. By modifying a conventional cache process to perform operations beneficial to the generation of a key frame table allows for efficient and cost effective formation of a key frame table.

The modified cache process 600 initially retrieves 602 a frame from the data storage device, namely, a hard drive data storage device. A decision 604 then determines whether the frame is a key frame. When the decision 604 determines that the frame is a key frame, a decision 606 determines whether key frame information for the key frame is in the key frame table. When the decision 606 determines that the key frame information for the key frame is not in the key frame table, key frame information for the key frame is stored 608 in the key frame table. The key frame information can be obtained from the frame or through conventional processing of information in the frame as well as in other prior frames. Alternatively, when the decision 606 determines that the key frame information for the key frame is already in the key frame table, the block 608 is bypassed.

Following the block 608 or its being bypassed, or following the decision 604 when the frame is not a key frame, cache processing of the frame is performed 610. Here, the cache processing performs a cache algorithm in a conventional manner. In one embodiment, the cache processing can be performed without regard to the need for frames to be in the cache for purposes of presenting video in an accelerated manner. To the extent frames needed are not in the cache, the frames can be retrieved from the data storage device, which can remain activated during the acceleration process. Following the block 610, a decision 612 determines whether more video data is to be cached at this time. When the decision 612 determines that more video data is to be cached at this time, a next frame is determined 614. Then, the modified cache process 600 returns to repeat the block 602 and subsequent operations so that the next frame of the video file can be similarly processed. On the other hand, once the decision 612 determines that no more data is to be cached at this time, the modified cache process 600 ends.

Figure 7:
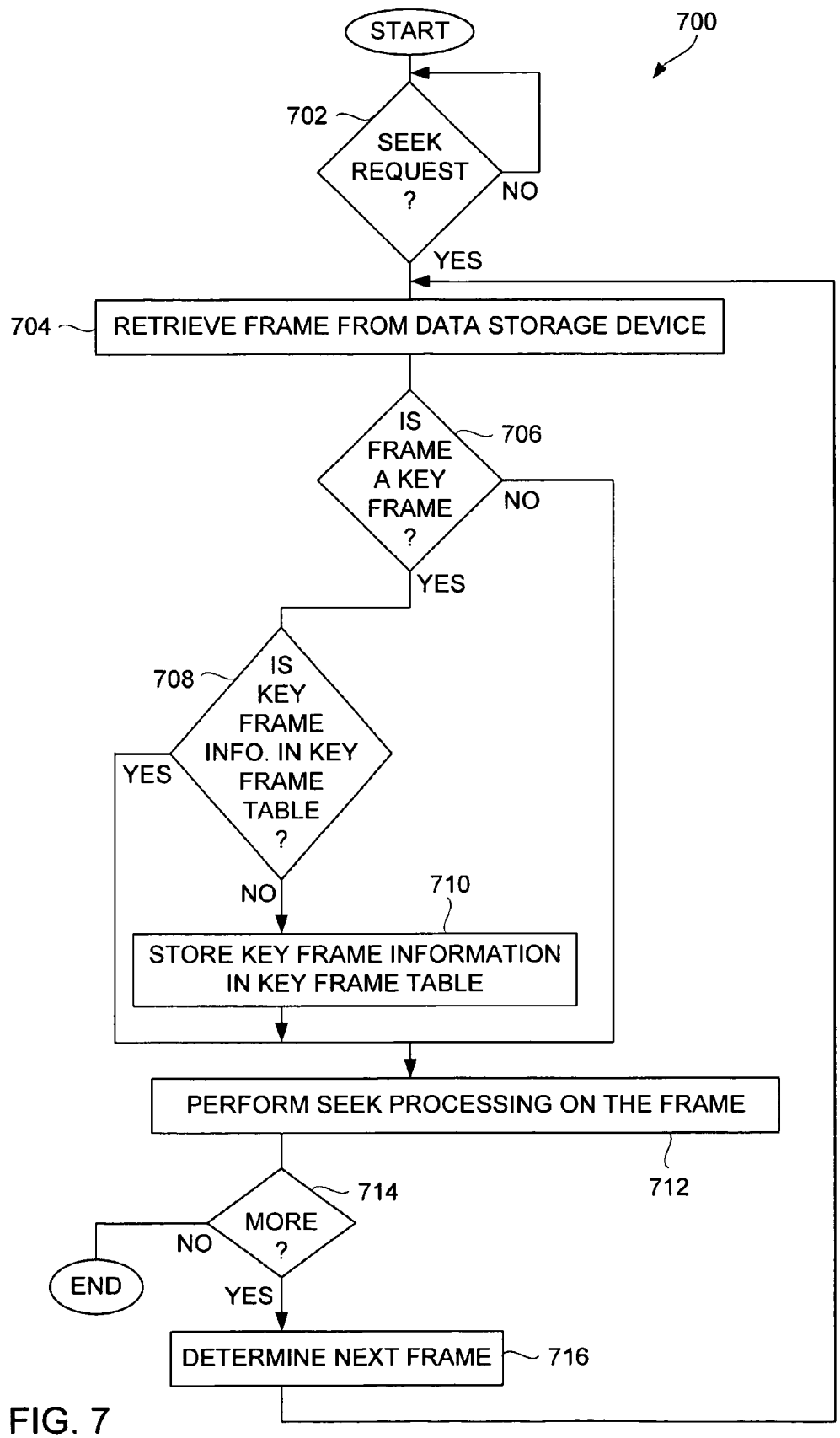
FIG. 7 is a flow diagram of a modified seek process according to one embodiment of the invention.

FIG. 7 is a flow diagram of a modified seek process 700 according to one embodiment of the invention. The modified seek process 700 concerns modifications to a conventional seek process that can be performed to facilitate utilization of a key frame table as discussed above. In other words, it is advantageous that the key frame table include key frame information for the various key frames of a video file to be presented. By modifying a conventional seek process to perform operations beneficial to the generation of a key frame table allows for efficient and cost effective formation of a key frame table. In general, a seek operation (or seek mode) is an operational mode of the media device in which the media device assists the user in moving a playback position to a desired point in the media.

The modified seek process 700 begins with a decision 702 that determines whether a seek request has been issued. When the decision 702 determines that a seek request has not been issued, the modified seek process 700 awaits such a request. In other words, the modified seek process 700 is effectively invoked when a seek request is issued. Once the decision 702 determines that a seek request has issued, a frame is retrieved 704 from the data storage device, namely, a hard drive data storage device. A decision 706 then determines whether the frame is a key frame. When the decision 706 determines that the frame is a key frame, a decision 708 determines whether key frame information for the key frame is in the key frame table. When the decision 708 determines that the key frame information for the key frame is not in the key frame table, key frame information for the key frame is stored 710 in the key frame table. The key frame information can be obtained from the frame or through conventional processing of information in the frame as well as in other prior frames. Alternatively, when the decision 708 determines that the key frame information for the key frame is already in the key frame table, the block 710 is bypassed.

Following the block 710 or its being bypassed, or following the decision 706 when the frame is not a key frame, seek processing on the frame is performed 712. Here, the seek processing performs a seek algorithm in a conventional manner. In one embodiment, the seek processing can be performed in response to a user request. In another embodiment, the seek processing can be performed due to an internal system request (e.g., block 508 of FIG. 5A). To the extent frames needed by the seek processing are not in the cache, the frames can be retrieved from the data storage device, which can remain activated during the acceleration process. Following the block 712, a decision 714 determines whether more video data is to be traversed at this time. When the decision 714 determines that more video data is to be traversed at this time, a next frame is determined 716. Then, the modified seek process 700 returns to repeat the block 704 and subsequent operations so that the next frame of the video file can be similarly processed. On the other hand, once the decision 714 determines that no more data is to be traversed at this time, the modified seek process 700 ends.

The various aspects, embodiments, implementations or features of the invention can be used separately or in any combination.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that video can be output in an accelerated manner, yet have a smooth, regular presentation (as perceived by a user). The frames of the accelerated video being output are based on key frames, which tend to naturally occur at the more important scenes of the video. Another advantage of the invention is that the control of the acceleration process can be customized, such as to change its acceleration rate. Still another advantage of the invention is that the acceleration can pertain to a fast forward operation or a rewind operation using the same generalized approach. Yet still another advantage of the invention is that the invention facilitates accelerated video output yet allows a separate caching mechanism for normal video playback.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for presenting video in an accelerated manner, said method comprising:
    (a) receiving a request for accelerated presentation of a video, the video including a plurality of frames stored in a video file, some of the frames being key frames;
    (b) identifying, after receiving the request, a next successive key frame in the video file for the video;
    (c) retrieving the identified next successive key frame of the video; and
    (d) presenting the identified next successive key frame of the video in accordance with an acceleration rate that is inversely related to a period of time between the presenting of a current key frame and the next successive key frame wherein said presenting (d) presents successive key frames of the video on a display screen of a portable media device.

2. The method recited in claim 1, wherein said method further comprises:
    (e) periodically repeating said identifying (b), said retrieving (c) and said presenting (d).

3. The method recited in claim 2, wherein said repeating (e) continues so long as the video presentation is to remain accelerated.

4. The method recited in claim 3, wherein the video presentation is being accelerated in either a forward direction or a reverse direction.

5. The method recited in claim 2, wherein said repeating (e) is performed periodically in accordance with a predetermined period of time.

6. The method recited in claim 1, wherein the acceleration rate is initially set at a first rate and later increased to a second rate, the second rate being greater than the first rate.

7. The method recited in claim 1, wherein the acceleration rate changes from the first rate to the second rate after operating at the first rate for a predetermined duration.

8. The method recited in claim 1, wherein the request for accelerated video presentation is a request for a fast forward operation.

9. The method recited in claim 1, wherein the request for accelerated video presentation is a request for a rewind operation.

10. The method recited in claim 1, wherein said retrieving (c) of the identified next successive key frame of the video file is retrieved from a cache memory that temporarily stores at least a portion of the video file.

11. A method for playing a video on a media playback device in an accelerated manner, the media playback device having a display device, said method comprising:
    determining a next successive key frame in a video file for the video;
    identifying a storage location and at least one attribute of the next successive key frame;
    retrieving the next successive key frame based on the storage location and the at least one attribute;
    decoding the next successive key frame; and
    outputting the decoded successive key frame to the display device a period of time after the display of a current key frame wherein the period of time is inversely related to a playback acceleration rate.

12. The method recited in claim 11, wherein said method further comprises:
    periodically repeating said determining, said identifying, said retrieving, said decoding and said outputting.

13. The method recited in claim 12, wherein said repeating is periodically performed in accordance with a predetermined duration of time.

14. The method recited in claim 13, wherein the predetermined duration of time is provided by a timer event.

15. The method recited in claim 13, wherein the predetermined duration of time is dependent on a rate of acceleration to be provided.

16. The method recited in claim 12, wherein the media playback device includes a key frame table that provides the storage location and the at least one attribute for a plurality of key frames of the video file,
    wherein said determining of the next key frame is performed using the key frame table, and
    wherein said identifying of the storage location and the at least one attribute of the next key frame is provided by the key frame table.

17. The method recited in claim 16, wherein the media playback device is a portable media playback device.

18. A media playback device, comprising:
    a media store that stores video files, the video files including frames, and at least some of the frames are key frames;
    a processor capable of processing video concerning at least one of the video files in an accelerated manner by providing successive key frames of the at least one of the video files;
    an output device; and
    a decoder, operatively connected to said processor and said output device, said decoder being configured to receive the frames of the video from said processor and to output video presentation information to said output device in accordance with an acceleration rate that is inversely related to a period of time between the output of a current key frame and a next successive key frame.

19. The media playback device recited in claim 18, wherein the media playback device is a portable, handheld media playback device.

20. A media playback device, comprising:
    a user input device configured to receive a user video acceleration input;
    a media store that stores video files, the video files including frames, and at least some of the frames are key frames;
    a key frame table capable of storing key frame information pertaining to at least a plurality of the key frames of the video file;
    a processor capable of processing video concerning at least one of the video files in an accelerated manner in response to the user video acceleration input, said processor operates to process the video by outputting key frames of the video file, wherein the outputting is based upon a period of time between the display of a current key frame and a next successive key frame, the period of time being inversely related to the user video acceleration input;
    an output device; and
    a decoder, operatively connected to said processor and said output device, configured to receive the frames of the video from said processor and output video presentation information to said output device.

21. The media playback device recited in claim 20, wherein the key frame information is stored to said key frame table as a portion of the video file is being cached or as a seek to another portion of the video file is performed.

22. A computer readable medium including at least computer program code for presenting video in an accelerated manner, said computer readable medium comprising:
- computer program code for receiving a request for accelerated presentation of a video, the video including a plurality of frames stored in a video file, some of the frames being key frames;
- computer program code for identifying, after receiving the request, a next successive key frame in the video file for the video;
- computer program code for retrieving the identified next successive key frame of the video file; and
- computer program code for presenting the identified next successive key frame of the video a period of time after the presenting of a current key frame the period of time being inversely related to a video playback acceleration rate.

* * * * *

UNITED STATES PATENT AND TRADEMARK OFFICE
CERTIFICATE OF CORRECTION

| | |
|---|---|
| PATENT NO. | : 7,673,238 B2 |
| APPLICATION NO. | : 11/327544 |
| DATED | : March 2, 2010 |
| INVENTOR(S) | : Muthya K. Girish et al. |

It is certified that error appears in the above-identified patent and that said Letters Patent is hereby corrected as shown below:

On page 4, in column 1, under "Other Publications", line 53, delete "relased" and insert -- related --, therefor.

On page 4, in column 2, under "Other Publications", line 19, delete "Pervasice" and insert -- Pervasive --, therefor.

Signed and Sealed this
Twenty-second Day of November, 2011

David J. Kappos
*Director of the United States Patent and Trademark Office*